United States Patent
Yamada

(10) Patent No.: US 8,917,049 B2
(45) Date of Patent: Dec. 23, 2014

(54) MOTOR CONTROL APPARATUS

(71) Applicant: Denso Corporation, Kariya, Aichi-pref. (JP)

(72) Inventor: Jun Yamada, Nagoya (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 13/693,314

(22) Filed: Dec. 4, 2012

(65) Prior Publication Data
US 2013/0141031 A1 Jun. 6, 2013

(30) Foreign Application Priority Data
Dec. 5, 2011 (JP) .................................. 2011-265464

(51) Int. Cl.
| | | |
|---|---|---|
| G05B 19/40 | (2006.01) | |
| G05B 23/02 | (2006.01) | |
| H02P 7/00 | (2006.01) | |
| G05B 19/23 | (2006.01) | |
| G05B 19/4062 | (2006.01) | |

(52) U.S. Cl.
CPC ............ *G05B 19/23* (2013.01); *G05B 19/4062* (2013.01); *G05B 2219/42095* (2013.01); *G05B 2219/42294* (2013.01)
USPC .............................. 318/563; 318/565; 318/626

(58) Field of Classification Search
CPC ................................ G05B 23/02; G05B 19/40
USPC ............ 318/490, 563, 565, 568.24, 601, 602, 318/603, 626
See application file for complete search history.

(56) References Cited

U.S. PATENT DOCUMENTS

| | | | | |
|---|---|---|---|---|
| 4,749,930 A | * | 6/1988 | Faville et al. ................. | 318/696 |
| 6,230,576 B1 | * | 5/2001 | Yamada et al. ................. | 74/335 |
| 7,312,595 B2 | * | 12/2007 | Kamio et al. ................. | 318/701 |
| 7,667,427 B2 | * | 2/2010 | Kamio et al. ................. | 318/701 |
| 2004/0008002 A1 | | 1/2004 | Kamio et al. | |

FOREIGN PATENT DOCUMENTS

| | | |
|---|---|---|
| JP | 2004-056855 | 2/2004 |
| JP | 2007-314119 | 12/2007 |
| JP | 2009-124891 | 6/2009 |
| JP | 2011-199926 | 10/2011 |

* cited by examiner

*Primary Examiner* — Bentsu Ro
(74) *Attorney, Agent, or Firm* — Nixon & Vanderhye P.C.

(57) ABSTRACT

When a failure of a feedback control operation of an electric motor is sensed, a control unit changes the feedback control operation to an open loop control operation. At the time of executing the open loop control operation, the control unit sequentially changes the exciting phase of the motor without executing feedback of information of the count value of the encoder counter and rotates a rotor of the motor until a count value of an exciting phase change counter reaches an open loop target count value, which corresponds to a target rotational position of the rotor. When the control unit changes the feedback control operation to the open loop control operation, the control unit sets the open loop target count value by correcting a feedback target count value based on an exciting phase deviation correction value for the count value of the encoder counter.

6 Claims, 13 Drawing Sheets

FIG. 13

| TARGET RANGE | F/B TARGET COUNT VALUE |
|---|---|
| P-RANGE | REFERENCE POSITION + kOFFSETP |
| Non-P-RANGE | REFERENCE POSITION + kOFFSETNP |

MOTOR CONTROL APPARATUS

CROSS REFERENCE TO RELATED APPLICATION

This application is based on and incorporates herein by reference Japanese Patent Application No. 2011-265464 filed on Dec. 5, 2011.

TECHNICAL FIELD

The present disclosure relates to a motor control apparatus.

BACKGROUND

For instance, JP2004-56855A (corresponding to US2004/0008002A1) teaches a motor drive system. Here, the contents of US2004/0008002A1 are entirely incorporated herein by reference. In this motor drive system, a feed back control operation (hereinafter referred to as an F/B control operation) is executed as follows. Specifically, a pulse signal of an encoder, which is provided in an electric motor, is counted up or down according to a rotational direction of a rotor of the motor. A rotational position of the rotor is sensed based on this encoder count value. The rotor is rotated by sequentially changing an exciting phase of the motor until the encoder count value reaches a target count value, which corresponds to a target rotational position of the rotor. In the above motor drive system, a failure of the F/B control system of the motor is monitored. When the failure of the F/B control system is sensed, the operation is changed to an open loop control operation. In the open loop control operation, the exciting phase of the motor is sequentially changed without relying on the feedback of the information of the encoder count value, and an exciting phase change count value is counted up or down according to the rotational direction of the rotor every time when the exciting phase of the motor is changed. In this way, the rotor is rotated until the exciting phase change count value reaches an open loop target count value, which corresponds to the target rotational position of the rotor. In this system, besides the encoder, an output shaft sensor, which senses a rotational angle (shift position) of an output shaft of the motor, is provided. The open loop control operation is executed based on the rotational angle (the shift position) of the output shaft of the motor, which is sensed with the output shaft sensor, upon the sensing of the failure of the F/B control system.

Lately, it has been demanded to reduce the number of the required components and the costs. In view of such a demand, it has been proposed to eliminate the output shaft sensor. However, in JP2004-56855A (US2004/0008002A1), the reference position for the open loop control operation (e.g., an initial position at the time of starting the open loop control operation) is set based on the output signal of the output shaft sensor. Thus, when the output shaft sensor is eliminated, the reference position for the open loop control operation cannot be set. Thus, the open loop control operation cannot be executed.

SUMMARY

The present disclosure addresses the above disadvantages.

According to the present disclosure, there is provided a motor control apparatus, which includes an encoder, an encoder counter, an exciting phase change counter, a feedback controlling unit, a failure monitoring unit and a fail-safe unit. The encoder outputs a pulse signal every time when a rotor of an electric motor, which rotates a rotatable member of a control subject, is rotated by a predetermined rotational angle. The encoder counter counts up or down the pulse signal of the encoder. The exciting phase change counter counts up or down every time when an exciting phase of the electric motor is changed. The feedback controlling unit executes a feedback control operation of the electric motor by sequentially changing the exciting phase of the electric motor based on a count value of the encoder counter to rotate the rotor until the count value of the encoder counter reaches a feedback target count value, which corresponds to a target rotational position of the rotor. The failure monitoring unit monitors whether a failure exists in the feedback control operation of the electric motor. The fail-safe unit changes the feedback control operation to an open loop control operation when the failure of the feedback control operation is sensed with the failure monitoring unit. When the fail-safe unit executes the open loop control operation, the fail-safe unit sequentially changes the exciting phase of the electric motor without executing feedback of information of the count value of the encoder counter in the open loop control operation and rotates the rotor until a count value of the exciting phase change counter reaches an open loop target count value, which corresponds to the target rotational position of the rotor.

In the above motor control apparatus, when the fail-safe unit changes the feedback control operation to the open loop control operation upon the sensing of the failure of the feedback control operation, the fail-safe unit sets the open loop target count value by correcting the feedback target count value based on an exciting phase deviation correction value for the count value of the encoder counter.

Alternatively or additionally, in the above motor control apparatus, when the fail-safe unit changes the feedback control operation to the open loop control operation upon the sensing of the failure of the feedback control operation, the fail-safe unit may change a setting method, which sets the open loop target count value, based on a control state of the electric motor at the time of sensing the failure of the feedback control operation.

BRIEF DESCRIPTION OF THE DRAWINGS

The drawings described herein are for illustration purposes only and are not intended to limit the scope of the present disclosure in any way.

FIG. 13 is a diagram showing a relationship between a target range and an F/B target count value.

DETAILED DESCRIPTION

A range change apparatus of an automatic transmission according to an embodiment of the present disclosure will be described.

Figure 1A:
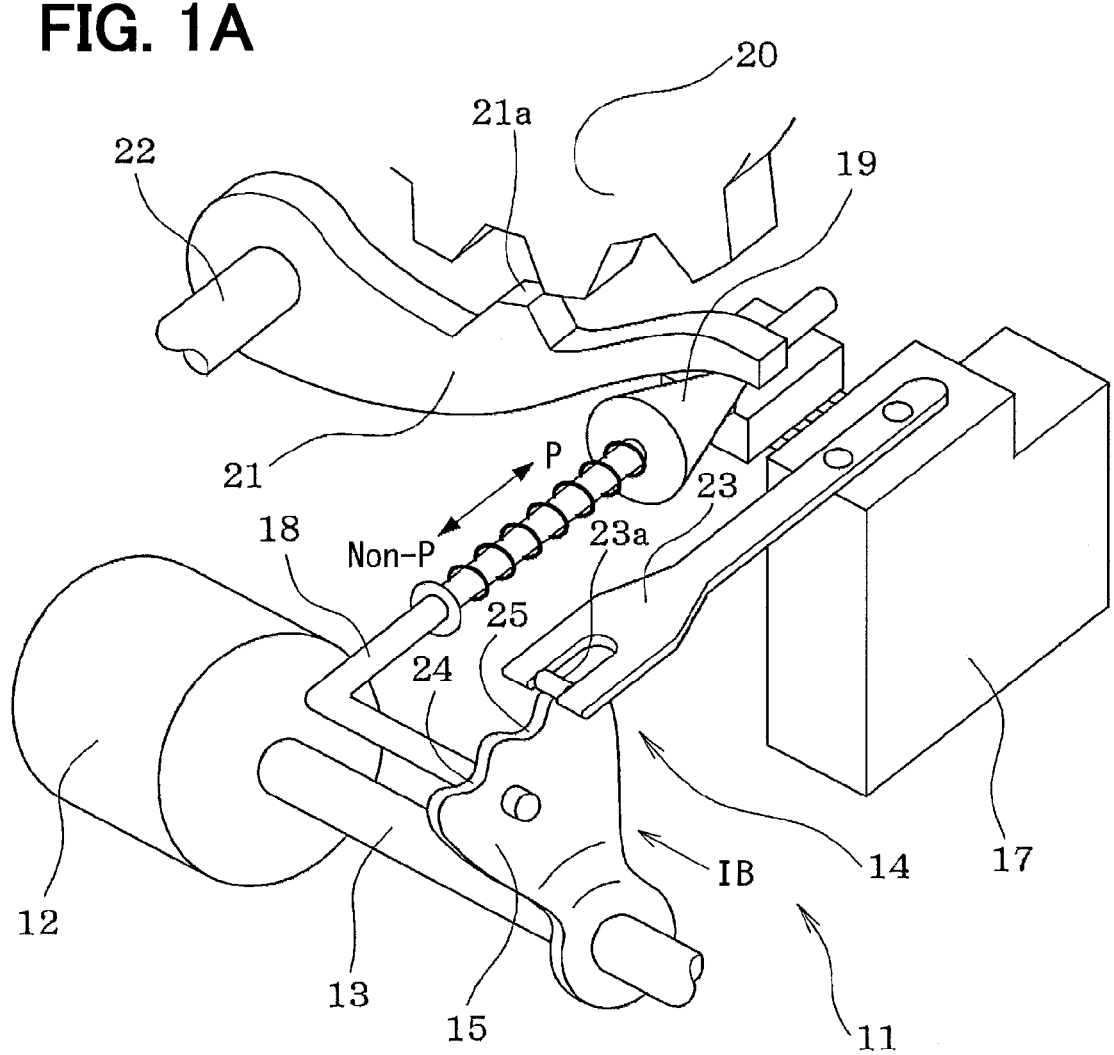
FIG. 1A is a perspective view of a range change apparatus according to an embodiment of the present disclosure.
Figure 1B:
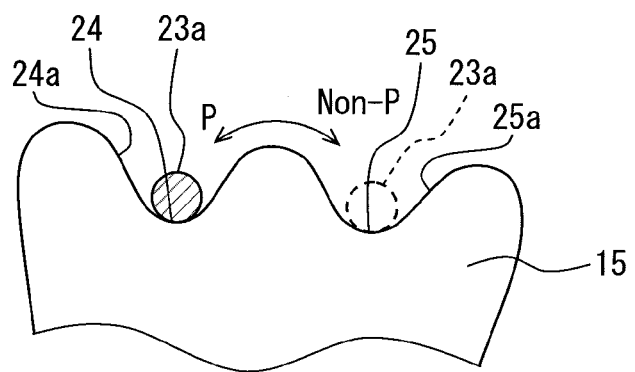
FIG. 1B is a schematic partial enlarged side view taken in a direction of an arrow IB in FIG. 1A, showing a P-range holding recess and a Non-P-range holding recess of a detent lever along with an engaging portion of a detent spring in the range change apparatus according to the embodiment.

First of all, a structure of a range change mechanism 11 will be schematically described with reference to FIGS. 1A and 1B. An electric motor 12, which serves as a drive source of the range change mechanism 11, may be, for example, a switched reluctance (SR) motor. The motor 12 includes a speed reducing mechanism 26 (see FIG. 4), which reduces a rotational speed of a rotor 32 of the motor 12. A detent lever 15 is fixed to an output shaft 13 of the motor 12.

A parking rod 18, which is configured into an L-shape, is fixed to the detent lever 15. A conical body 19, which is provided at a distal end portion of the parking rod 18, contacts a lock lever 21. The lock lever 21 is pivoted upward or downward about a shaft 22 depending on an operational position of the conical body 19 to lock or unlock a parking gear 20. The parking gear 20 is provided to an output shaft of the automatic transmission (A/T) 27. When the parking gear 20 is locked by the lock lever 21, drive wheels of the vehicle are held in a non-rotatable state (a parking state).

A detent spring 23 is fixed to a support base 17 to hold the detent lever 15 to a parking range (hereinafter, referred to as a P-range) or to another range (hereinafter, referred to as a Non-P-range), which is other than the parking range. When an engaging portion 23a (indicated with a shade in FIG. 1B), which is provided to a distal end of the detent spring 23, is fitted into a P-range holding recess 24 of the detent lever 15, the detent lever 15 is held in a position of the P-range shown in FIG. 1B. Alternatively, when the engaging portion 23a (indicated with a dotted line in FIG. 1B) of the detent spring 23 is fitted into a Non-P-range holding recess 25 of the detent lever 15, the detent lever 15 is held in a position of the Non-P-range. The detent lever 15 and the detent spring 23 form a detent mechanism 14, which holds the rotational position of the detent lever 15 at the corresponding one of the ranges through use of the detent lever 15 and the detent spring 23.

In the P-range, the parking rod 18 is moved toward the lock lever 21, so that a large diameter portion of the conical body 19 pushes the lock lever 21 upward. Thereby, a protrusion 21a of the lock lever 21 is received in the parking gear 20 to lock the parking gear 20. In this way, the output shaft (the drive wheels) of the automatic transmission 27 is placed in the locked state (the parking state).

In the Non-P-range, the parking rod 18 is moved in a direction away from the lock lever 21. Thereby, the large diameter portion of the conical body 19 is removed from the lock lever 21, so that the lock lever 21 is pivoted downward. In this way, the protrusion 21a of the lock lever 21 is released from the parking gear 20 to unlock the parking gear 20. Therefore, the output shaft of the automatic transmission 27 is held in the rotatable state (drivable state of the vehicle).

Figure 2:
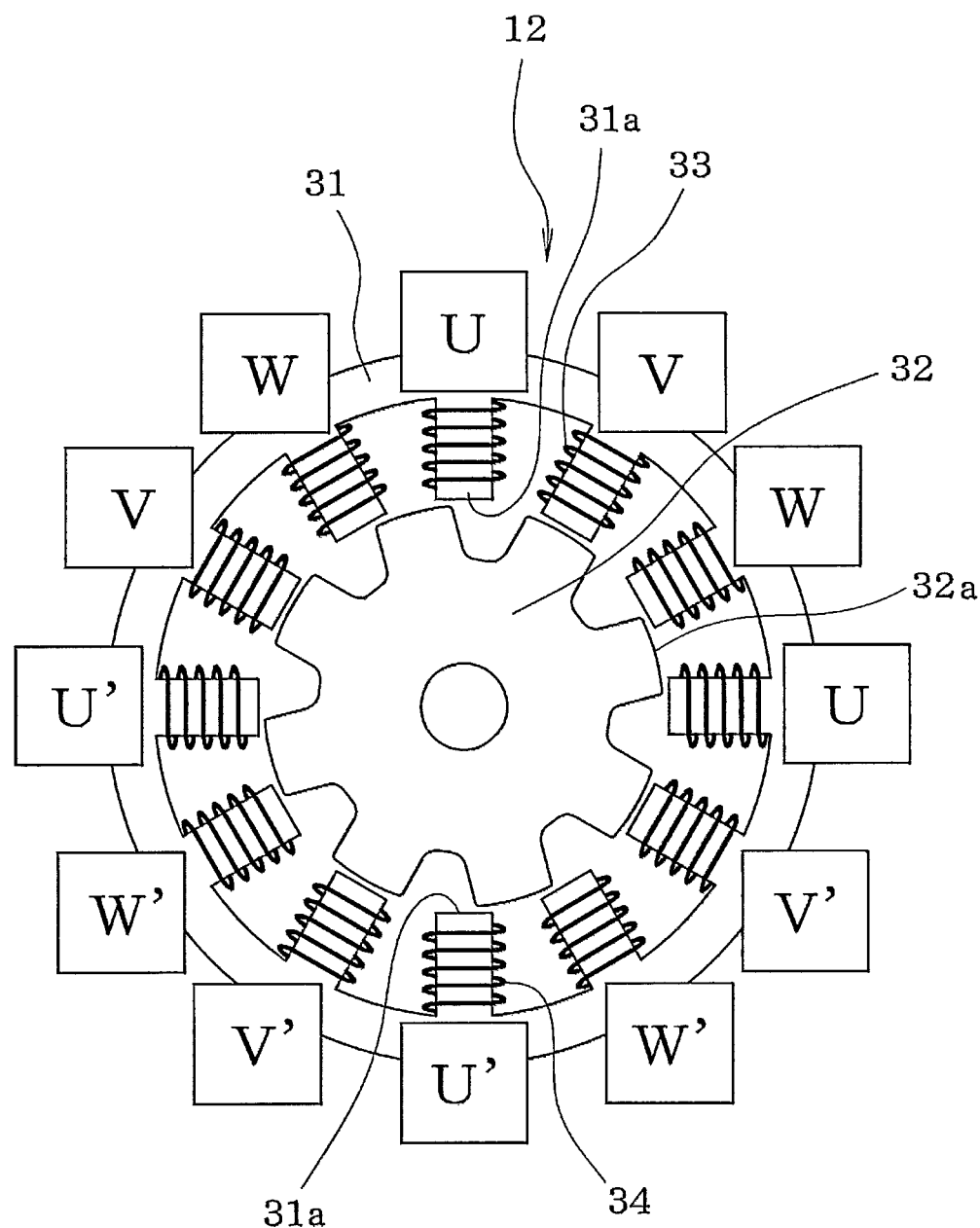
FIG. 2 is a diagram showing a structure of an SR motor of the range change apparatus of the embodiment.

Next, a structure of the motor 12 will be described with reference to FIG. 2.

In the present embodiment, the switched reluctance motor (SR motor) is used as the motor 12, as discussed above. In the SR motor 12, both of a stator 31 and the rotor 32 have salient poles, so that a permanent magnet is not required, thereby implementing the simple structure. For example, twelve salient poles 31a are arranged one after another at generally equal intervals at an inner peripheral portion of the cylindrical stator 31. Furthermore, for example, eight salient poles 32a are arranged one after another at generally equal intervals at an outer peripheral portion of the rotor 32. When the rotor 32 is rotated, each of the salient poles 32a of the rotor 32 is displaced to sequentially radially oppose the respective salient poles 31a of the stator 31 while a minute gap is interposed between the salient pole 32a of the rotor 32 and the opposed salient pole 31a of the stator 31. Six windings 33 of a U-phase, a V-phase and a W-phase and six windings 34 of a U'-phase, a V'-phase and a W'-phase are wound sequentially at the twelve salient poles 31a of the stator 31. It should be understood that the number of the salient poles 31a of the stator 31 and the number of the salient poles 32a of the rotor 32 may be changed to any other suitable numbers.

Figure 3:
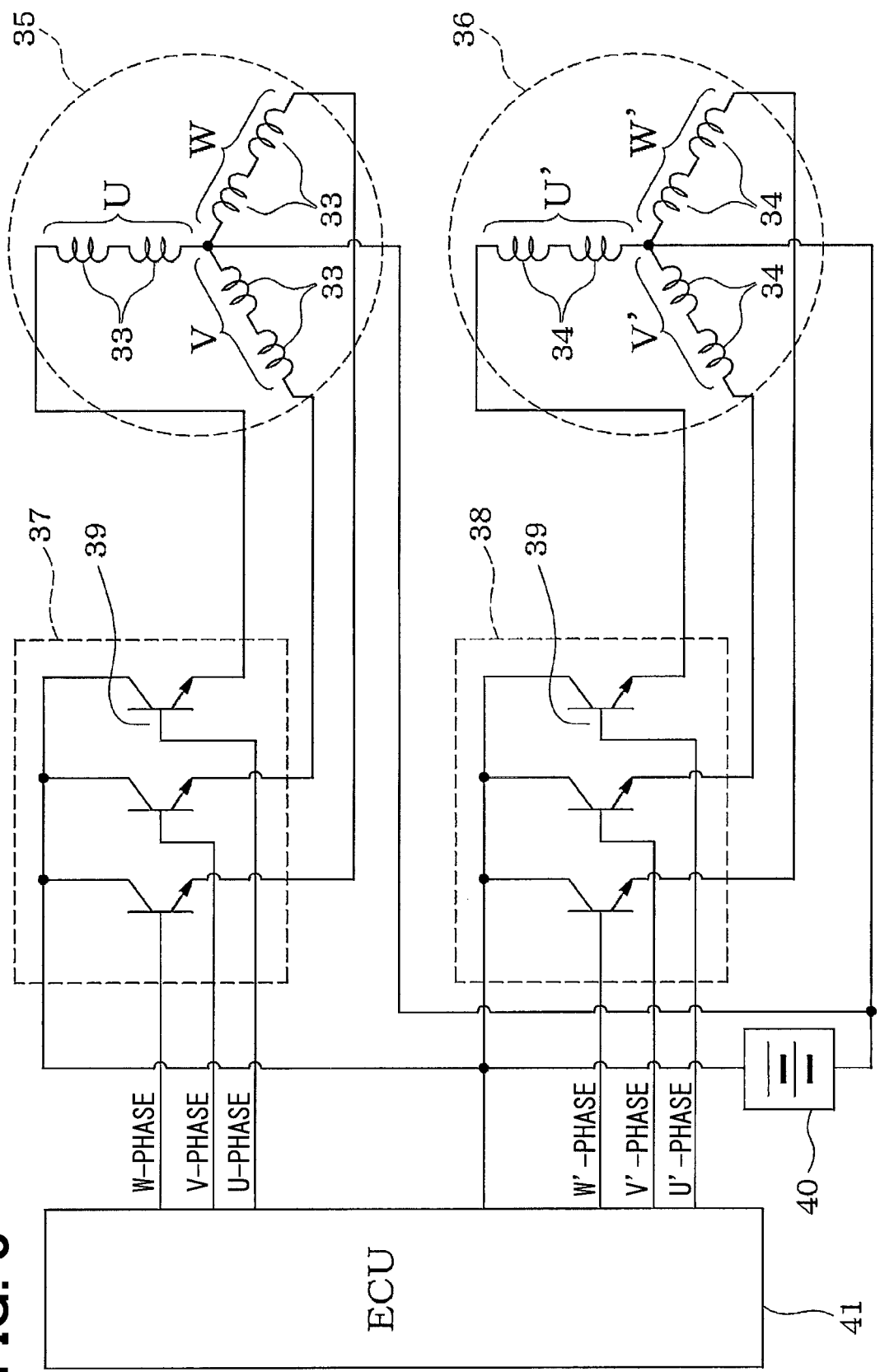
FIG. 3 is a circuit diagram showing a circuit structure, which drives the SR motor, according to the embodiment.

In the present embodiment, the winding sequence of the windings 33, 34 relative to the twelve salient poles 31a is in an order of the V-phase, the W-phase, the U-phase, the V-phase, the W-phase, the U-phase, the V'-phase, the W'-phase, the U'-phase, the V'-phase, the W'-phase and the U'-phase. As shown in FIG. 3, the six windings 33 of the U-phase, the V-phase and the W-phase and the six windings 34 of the U'-phase, the V'-phase and the W'-phase are electrically connected to form two systems of motor exciting arrangements 35, 36. In the one motor exciting arrangement 35, the six windings 33 of the U-phase, the V-phase and the W-phase are electrically connected to form a Y-connection (two windings 33 of the same phase being connected in series). In the other motor exciting arrangement 36, the six windings 34 of the U'-phase, the V'-phase and the W'-phase are electrically connected to form a Y-connection (two windings 34 of the same phase being connected in series). In the two motor exciting arrangements 35, 36, the U-phase and the U'-phase are energized simultaneously, and the V-phase and the V'-phase are energized simultaneously. Furthermore, the W-phase and the W'-phase are energized simultaneously.

These two motor exciting arrangements 35, 36 are driven by separate motor drivers 37, 38, respectively, while a battery 40 of the vehicle is used as an electric power source. As discussed above, in the case where the two systems of the motor exciting arrangements 35, 36 and of the motor drivers 37, 38 are provided, even when one of the two systems fails, the other one of the two systems can be used to rotate the motor 12. In the exemplary circuit structure of the motor drivers 37, 38 shown in FIG. 3, there is provided a unipolar drive circuit structure, in which one switching element (e.g., a transistor) 39 is provided for each of the phases. Alternatively, it is possible to provide a bipolar drive circuit structure, in which two switching elements are provided for each of the phases. Also, it should be noted that only one system of the motor exciting arrangement and of the motor driver may be alternatively used.

Figure 4:
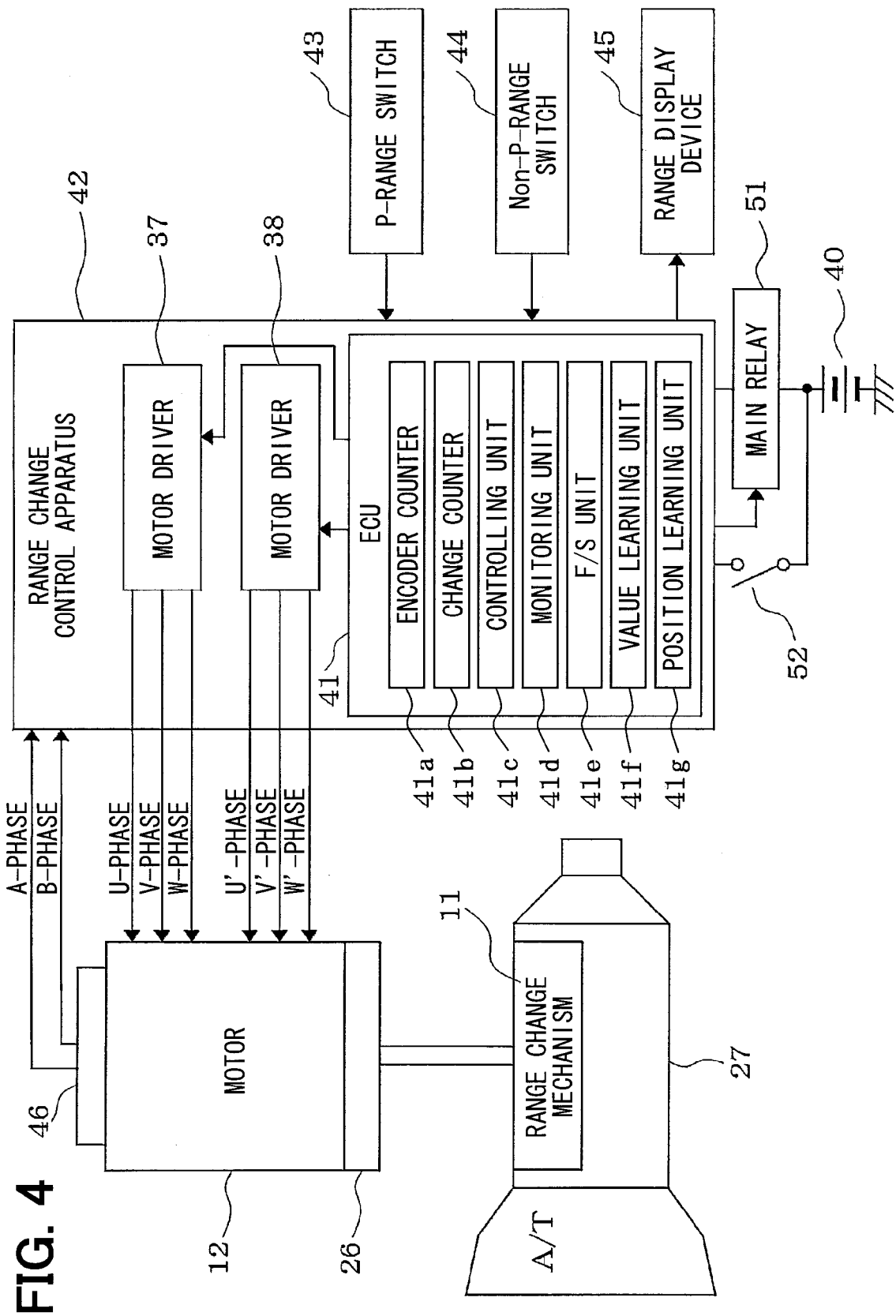
FIG. 4 is a schematic diagram showing an entire control system structure of the range change apparatus according to the embodiment.

The turning on/off of each switching element 39 of each motor driver 37, 38 is controlled by an electronic control unit (ECU) 41. As shown in FIG. 4, the ECU 41 and the motor drivers 37, 38 are installed in a range change control apparatus (serving as a part of a motor control apparatus of the present disclosure) 42. An operational signal of a P-range switch 43, which is manipulated by a driver of the vehicle to change the range to the P-range, and an operational signal of a Non-P-range switch 44, which is manipulated by the driver to change the range to the Non-P-range, are supplied to the range change control apparatus 42. The selected range, which is selected by the manipulation of the P-range switch 43 or the Non-P-range switch 44, is displayed on a range display device 45 that is provided to an instrument panel (not shown) in a passenger compartment of the vehicle.

An electric power is supplied to the range change control apparatus 42 from the battery 40 installed in the vehicle through a main relay 51 (a power source switch). The turning on/off of the main relay 51 is made through turning on/off of an ignition switch 52. When the ignition switch 52 is turned on, the main relay 51 is turned on. Thereby, the electric power is supplied to the range change control apparatus 42. In contrast, when the ignition switch 52 is turned off, the main relay 51 is turned off after elapse of a predetermined time period (a time period required to execute a finalization process of each corresponding control program). Thereby, the supply of the electric power to the range change control apparatus 42 is stopped.

Figure 5:
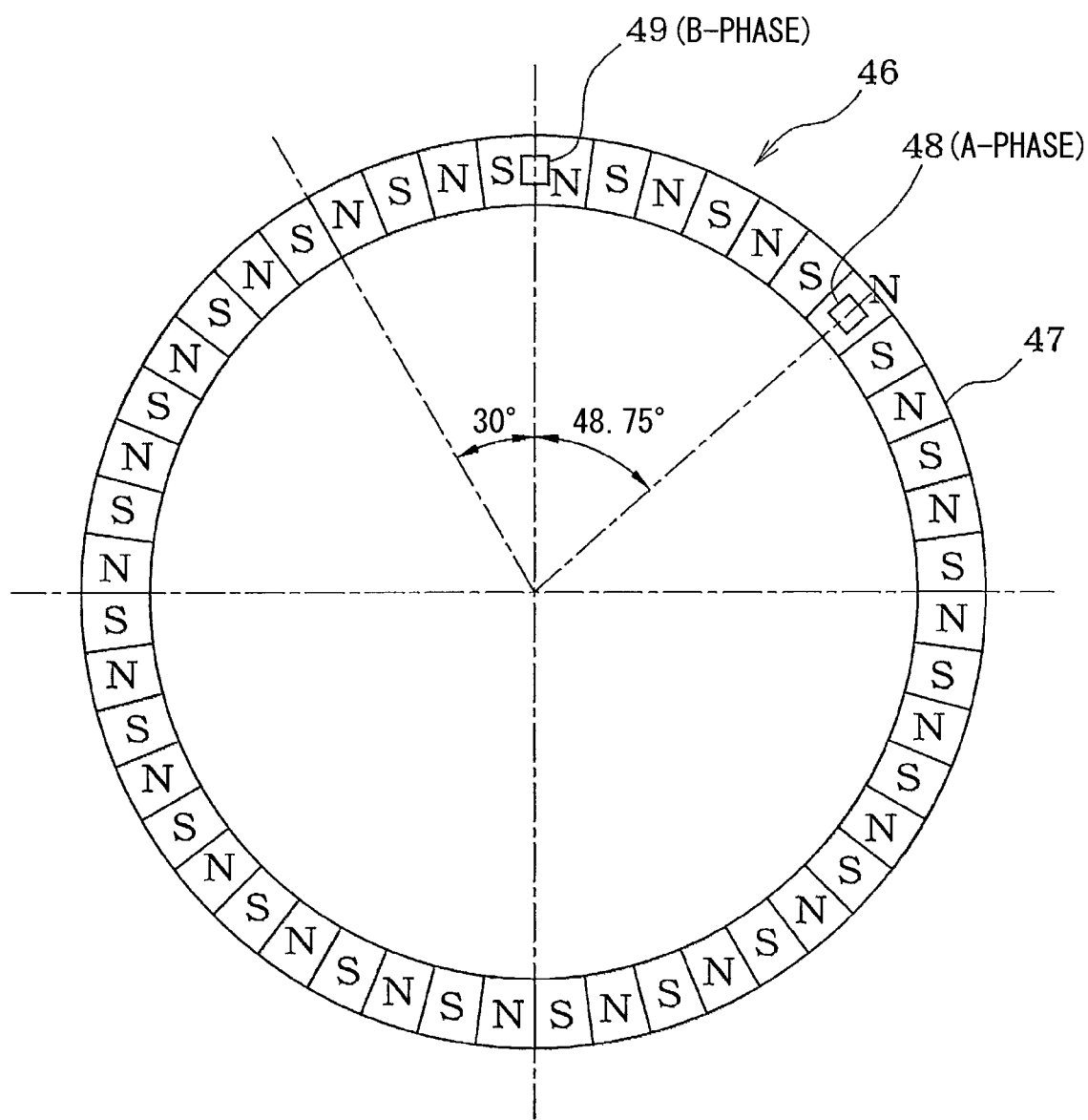
FIG. 5 is a plan view showing a structure of a rotary magnet of an encoder provided to the SR motor of the embodiment.
Figure 6:
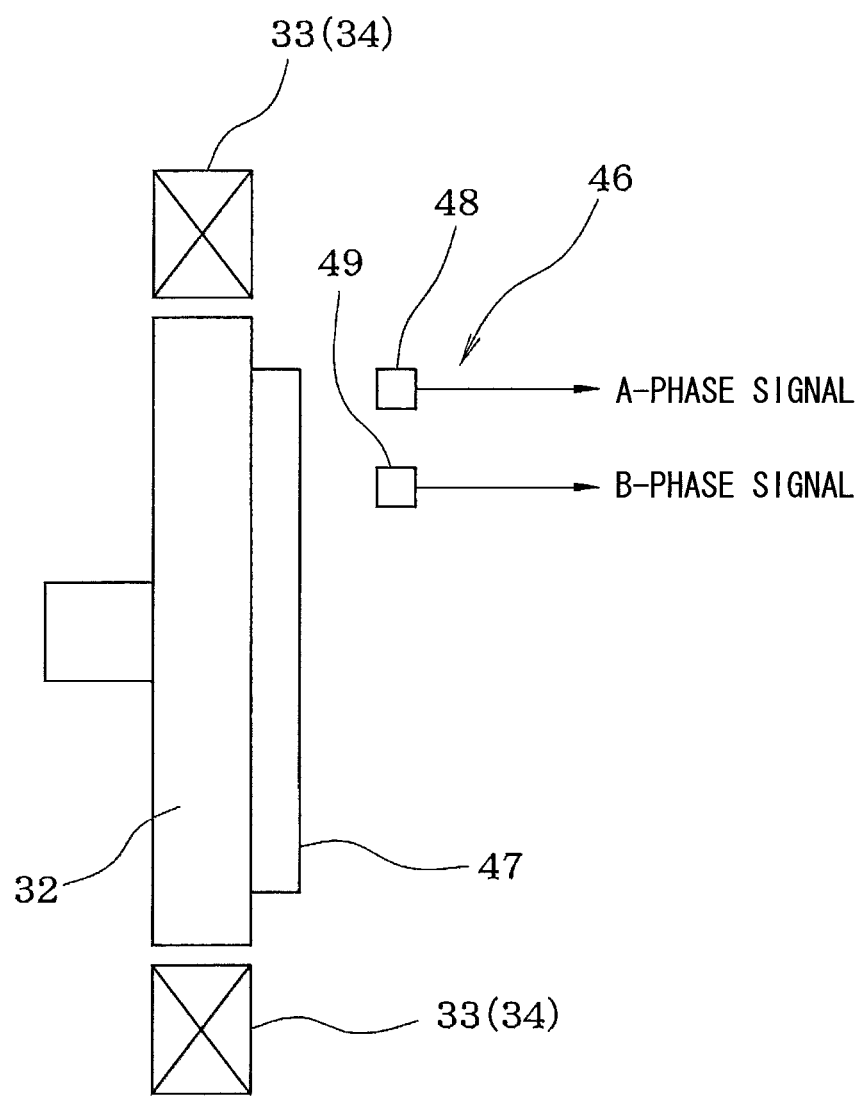
FIG. 6 is a lateral view of the encoder of the embodiment.

An encoder 46 is provided to the SR motor 12 to sense a rotational position of the rotor 32. The encoder 46 and the range change control apparatus 42 may cooperate with each other to form the motor control apparatus of the present disclosure. The encoder 46 is, for example, a magnetic rotary encoder. Specifically, as shown in FIGS. 5 and 6, an annular rotary magnet 47, in which N-poles and S-poles are alternately arranged one after another at equal pitches in a circumferential direction, is coaxially fixed to a side surface of the rotor 32. Each of two magnetic sensing devices (e.g., two Hall ICs) 48, 49 is arranged at a corresponding location that opposes the rotary magnet 47.

In the present embodiment, a magnetizing pitch (pole pitch) between the adjacent N-pole and S-pole in the rotary magnet 47 is set to be 7.5 degrees. This magnetizing pitch (7.5 degrees) of the rotary magnet 47 is set to be the same angle as a rotational angle of the rotor 32 per excitation of the motor 12 (the rotational angle of the rotor 32 per switching of the exciting phase). As will be described later, when the exciting phase(s) of the motor 12, which is being excited, is sequentially changed six times in the 1-2 phase excitation mode, the rotor 32 and the rotary magnet 47 are integrally rotated by 45 degrees (i.e., 7.5 degrees×6=45 degrees). The total number of the N-poles and the S-poles within the rotational angular range of 45 degrees of the rotary magnet 47 is 6 poles.

Figure 7A:
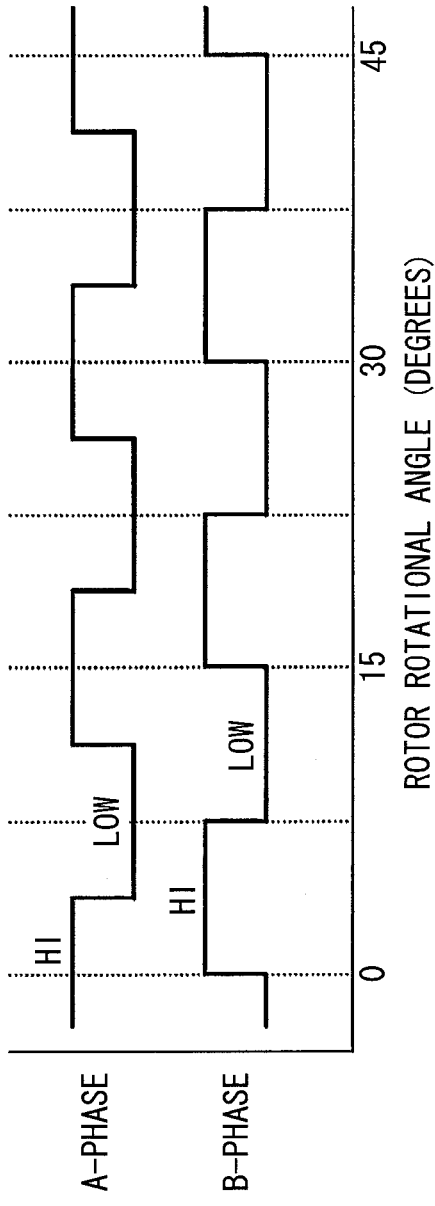
FIG. 7A is a time chart showing an output waveform of the encoder of the embodiment.

The two magnetic sensing devices 48, 49 are arranged to have the following relationship relative to the rotary magnet 47. The magnetic sensing device 48, which outputs the A-phase signal, and the magnetic sensing device 49, which outputs the B-phase signal, are placed along a common imaginary circle such that these two magnetic sensing devices 48, 49 can oppose each of the magnetizing portions (N, S) of the rotary magnet 47. An interval between the magnetic sensing device 48 and the magnetic sensing device 49, which output the A-phase signal and the B-phase signal, respectively, is set such that an electrical angle of a phase difference between the A-phase signal and the B-phase signal is 90 degrees (a mechanical angle of 3.75 degrees) as shown in FIG. 7A. Here, the electrical angle is an angle defined in a case where one signal generation period of the A-phase signal and of the B-phase signal is set to 360 degrees. The mechanical angle is an angle defined in a case where one rotation of the rotor 32 is set to 360 degrees. The rotational angle of the rotor 32 from the falling edge (or the rising edge) of the A-phase signal to the falling edge (or the rising edge) of the B-phase signal corresponds to the mechanical angle of the phase difference between the A-phase signal and the B-phase signal.

Every time when each magnetic sensing device 48, 49 is opposed to the N-pole, the output of the magnetic sensing device 48, 49 becomes the high level ("1"). Furthermore, every time when each magnetic sensing device 48, 49 is opposed to the S-pole, the output of the magnetic sensing device 48, 49 becomes the low level ("0").

In the present embodiment, the ECU 41 counts the rising edges and falling edges of the A-phase signal and the rising edges and falling edges of the B-phase signal through an encoder counter 41a (see FIG. 4). The ECU 41 changes the exciting phase of the motor 12 based on the count value (hereinafter referred to as an encoder count value) of the encoder counter 41a to rotate the rotor 32. At this time, the rotational direction of the rotor 32 of the motor 12 is determined based on the generating sequence of the A-phase and B-phase signals (i.e., based on which one of the A-phase signal and the B-phase signal is generated first). In the case of the normal rotation (i.e., the rotation in the rotational direction of the P-range to the Non-P-range), the encoder count value is counted up. On the other hand, in the case of the reverse rotation (i.e., the rotation in the rotational direction of the Non-P-range to the P-range), the encoder count value is counted down. In this way, even when the rotor 32 is rotated in any one of the normal rotational direction and the reverse rotational direction, the relationship between the encoder count value and the rotational position of the rotor 32 is maintained. Thus, even when the rotor 32 is rotated in any one of the normal rotational direction and the reverse rotational direction, the rotational position (the rotational angle) of the rotor 32 can be sensed based on the encoder count value. Then, based on the sensed rotational position of the rotor 32, the windings 33, 34, which correspond to the sensed rotational position of the rotor 32, are energized to rotate the rotor 32.

Figure 7B:
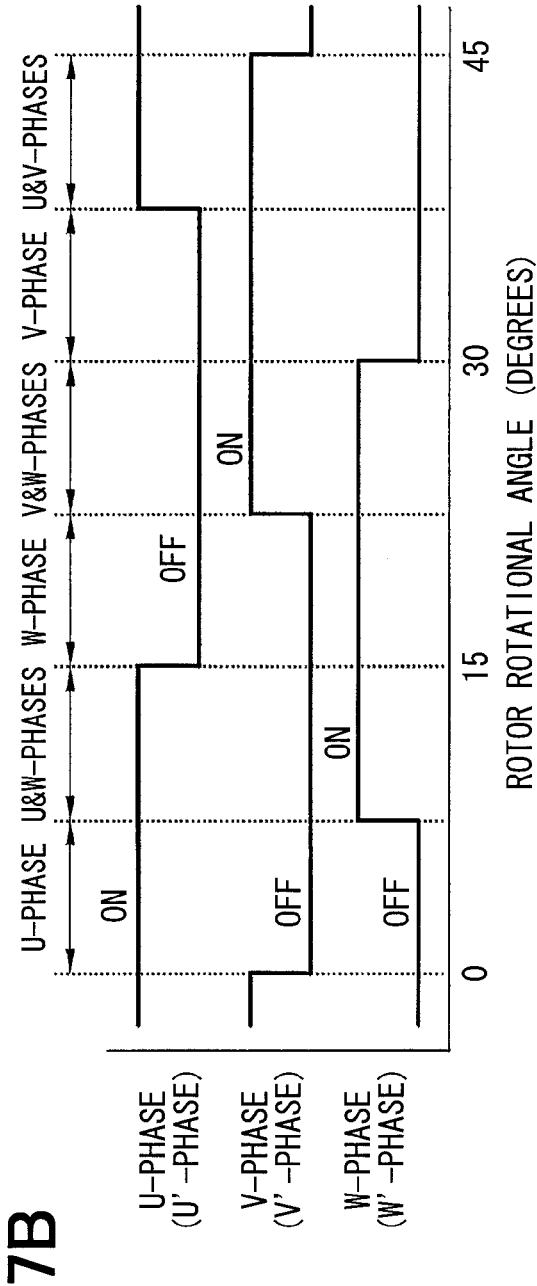
FIG. 7B is a time chart showing a change pattern of an exciting phase(s) of the SR motor according to the embodiment.

FIG. 7A shows the output waveform of the encoder 46 at the time of rotating the rotor 32 in the reverse rotational direction (the rotational direction from the Non-P-range to the P-range). FIG. 7B shows the change pattern of the exciting phase(s) of the motor 12 at the time of rotating the rotor 32 in the reverse rotational direction (the rotational direction from the Non-P-range to the P-range). In any of the reverse rotational direction (the rotational direction from the Non-P-range to the P-range) and the normal rotational direction (the rotational direction from the P-range to the Non-P-range), every time when the rotor 32 is rotated by 7.5 degrees, switching between the 1-phase excitation and the 2-phase excitation takes place. For example, when the rotor 32 is rotated by 45 degrees, the exciting phase(s) is changed through one complete cycle in the order of the U-phase excitation, the U and W-phase excitation, the W-phase excitation, the V and W-phase excitation, the V-phase excitation, and the U and V-phase excitation.

Every time when the exciting phase(s) is changed, the rotor 32 is rotated by 7.5 degrees. Therefore, the magnetic pole of the rotary magnet 47, which is opposed the corresponding one of the magnetic sensing devices 48, 49 that output the A-phase signal and the B-phase signal, respectively, is changed from the N-pole to the S-pole or the S-pole to the N-pole. Thereby, the level of the A-phase signal and the level of the B-phase signal are alternately reversed. As a result, every time when the rotor 32 is rotated by 7.5 degrees, the encoder count value is counted up (or counted down) by 2. In this specification, the state of achieving the high level ("1") of the A-phase signal is sometimes rephrased that the A-phase signal is outputted. Similarly, the state of achieving the high level ("1") of the B-phase signal is sometimes rephrased that the B-phase signal is outputted.

The encoder count value is stored in the RAM of the ECU 41. Therefore, when the electric power supply of the ECU 41 is turned off (through the turning off of the ignition switch 52), the stored encoder count value is lost. Thereby, the encoder count value (0) right after the turning on of the electric power supply of the ECU 41 (i.e., turning on of electric power supply from the electric power source, i.e., the battery 40 to the range change control apparatus 42, which includes the ECU 41) may not correspond to the actual rotational position (exciting phase) of the rotor 32. Thus, in order to change the exciting phase(s) based on the encoder count value, it is necessary to make sure that the encoder count value immediately after the turning on of the electric power supply corresponds to the actual rotational position of the rotor 32, so that the encoder count value and the exciting phase correspond with each other.

Because of the above need, in the present embodiment, the ECU 41 of the range change control apparatus 42 executes a learning process. Specifically, in the initial drive operation period after the turning on of the electric power supply of the ECU 41, the ECU 41 sequentially changes the exciting phase(s) of the motor 12 through one complete cycle at a predetermined time schedule, and at this time, the ECU 41 counts the edges of the A-phase signal and the edges of the B-phase signal at the encoder 46. Thereby, the ECU 41 learns the relationship among the encoder count value, the rotational position of the rotor 32 and the exciting phase at the end of the initial drive. Thereafter, at the time of the normal drive operation, the ECU 41 determines the exciting phase(s) of the motor 12 based on the encoder count value and the result of the learning obtained at the end of the initial drive operation.

Figure 8:
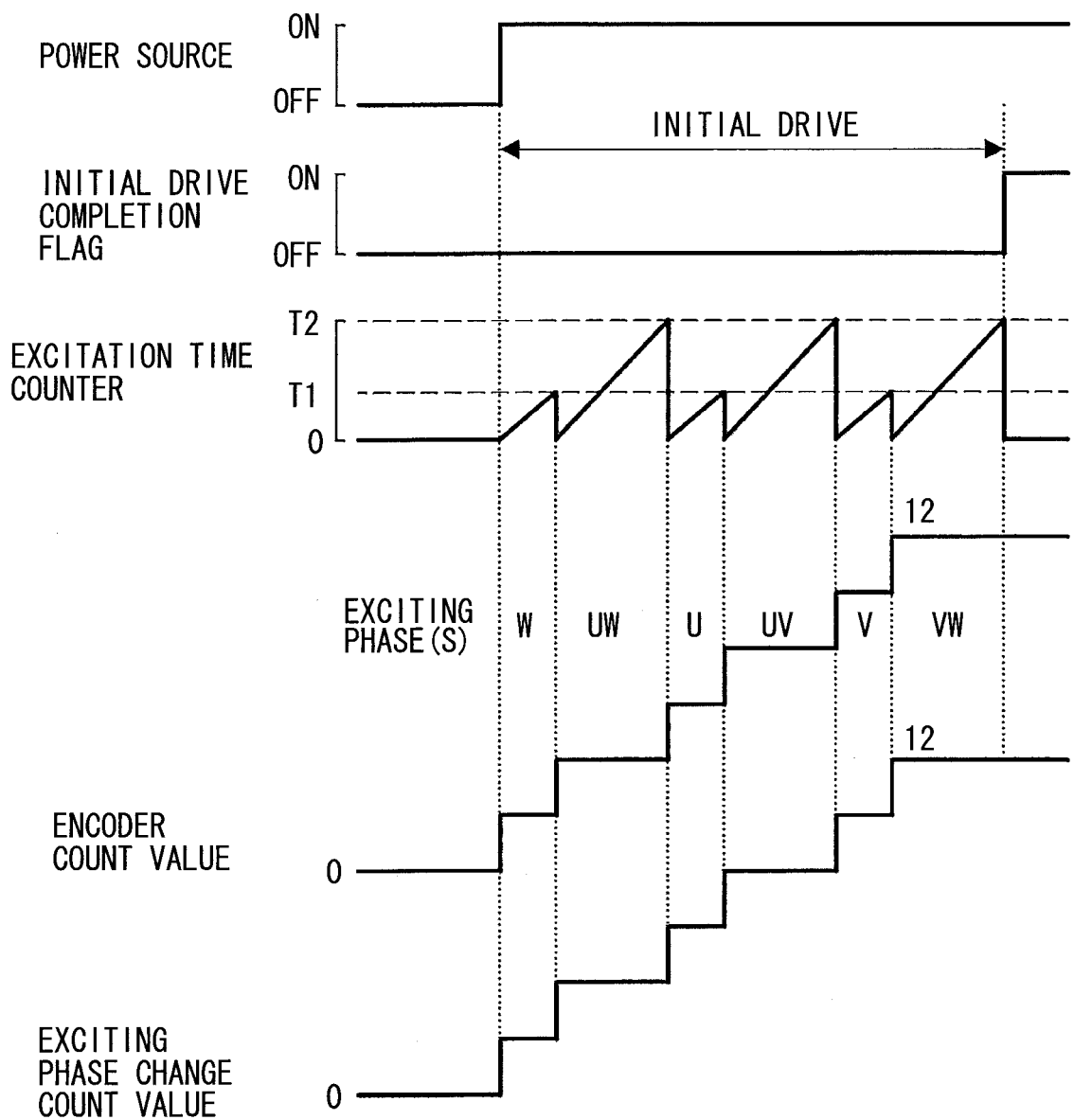
FIG. 8 is a time chart showing an exemplary control operation at the time of starting an initial drive operation at a P-range of an automatic transmission according to the embodiment.

More specifically, this learning process at the time of executing the initial drive operation is performed as follows. With reference to FIG. 8, which shows an exemplary operational case provided only for an illustrative purpose, in a case where the initial drive operation is started after the turning on of the electric power source of the ECU 41 at the P-range of the automatic transmission 27, the exciting phase(s) is sequentially changed through one complete cycle at the predetermined time schedule in the order of the W-phase excitation, the U and W-phase excitation, the U-phase excitation, the U and V-phase excitation, the V-phase excitation, and the V and W-phase excitation, so that the rotor 32 is rotated in the normal rotational direction (the rotational direction of the P-range to the Non-P-range).

In contrast, in the case where the initial drive operation is started after the turning on of the electric power source of the ECU 41 at the Non-P-range of the automatic transmission 27, the exciting phase(s) is sequentially changed through one complete cycle at the predetermined time schedule in the order of V-phase excitation, the U and V-phase excitation, the U-phase excitation, the U and W-phase excitation, the W-phase excitation, and the V and W-phase excitation, so that the rotor 32 is rotated in the reverse rotational direction (the rotational direction of the Non-P-range to the P-range).

In this initial drive operation period, a time period T1 of each 1-phase excitation is set to be shorter than a time period T2 of each 2-phase excitation (e.g., T1=10 ms and T2=100 ms). Even in the case where the rotational position of the rotor 32 and the corresponding exciting phase(s) are synchronized with each other during the initial drive operation, the rotor 32 tends to vibrate during each 1 phase excitation where the generated torque is relatively small. In view of this, the time period T1 of each 1 phase excitation is shortened to immediately shift to the following 2 phase excitation. In this way, the vibrations of the rotor 32 are rapidly damped to stabilize the output signal of the encoder 46.

As discussed above, when the exciting phase is sequentially changed through one complete cycle during the initial drive operation, the rotational position of the rotor 32 and the corresponding exciting phase(s) will coincide with each other at one of the exciting phases before the end of the initial drive operation. Thereafter, the rotation of the rotor 32 is synchronized with the predetermined sequential change of the exciting phase of the motor 12, and the A-phase signal and the B-phase signal are outputted from the encoder 46 synchronously with this rotation of the rotor 32.

During the initial drive operation, the rising edges and falling edges of the A-phase signal and of the B-phase signal of the encoder 46 are counted. Therefore, by checking the encoder count value at the end of the initial drive operation, the actual rotational angle (the actual rotational amount) of the rotor 32, which is rotated synchronously with the progress of the exciting phase change process, can be identified. Based on this angle of rotation (the actual amount of rotation), the relationship among the encoder count value, the rotational position of the rotor 32 and the exciting phase(s) at the end of the initial drive operation can be identified (determined).

In the exemplary case of FIG. 8, in the initial drive operation, the rotor 32 is rotated starting from the initial exciting phase (the W-phase). An excitation time counter counts the excitation time period of the current exciting phase(s), as shown in FIG. 8. Furthermore, every time when the exciting phase(s) is changed, the rotor 32 is rotated by 7.5 degrees, and the encoder count value is counted up by 2. Therefore, at the end of the initial drive operation, the encoder count value becomes 12.

In contrast, for instance, in a case where the rotor 32 is not rotated in the initial three excitations (the W-phase excitation, the U and W-phase excitation, and the U-phase excitation in this order), i.e., in a case where the rotational position of the rotor 32 and the corresponding exciting phase(s) are synchronized at and after the fourth excitation (the U and V-phase excitation, the V-phase excitation, and the V and W-phase excitation) to cause rotation of the rotor 32 by the amount corresponding to the three excitations, the rotor 32 is rotated by 22.5 degrees (i.e., 7.5 degrees×3=22.5 degrees). Thus, the encoder count value becomes 6 (i.e., 2×3=6). Thereby, by checking the encoder count value at the end of the initial drive operation, it is possible to identify the actual rotational angle (the actual rotational amount) of the rotor 32, which is rotated synchronously with the sequential change of the exciting phase(s) until the end of the initial drive operation.

In this case, at the last excitation during the initial drive operation, the V and W phases (2 phases) are excited as the last exciting phases, and a state of an initial drive completion flag is changed from OFF to ON at the end of the excitation of the V and W phases (see FIG. 8) to indicate the end of the initial drive operation. However, the last encoder count value is not necessary 12. That is, in some cases, the last encoder count value may be, for example, 8 or 4. During the normal drive operation after the initial drive operation, each corresponding exciting phase is determined based on the encoder count value. Thus, when the encoder count value is corrected by an exciting phase deviation correction value (i.e., a correction value for correcting the exciting phase deviation, which is a difference between the count value of the encoder counter and the corresponding exciting phase that is pre-assigned to this count value), the correct exciting phase(s) can be selected during the normal drive operation.

As in the case of FIG. 8, when the rotor 32 is rotated starting from the initial exciting phase (the W-phase), i.e., when the rotation of the rotor 32 is synchronized with the predetermined sequential change of the exciting phase of the motor 12 from the begging of the initial drive operation, the encoder count value at the end of the initial drive operation becomes 12. Therefore, when the encoder count value at the end of the initial drive operation is 8, the exciting phase deviation correction value is 4 (i.e., 12−8=4).

Exciting phase deviation correction value=12−"Encoder count value at the end of the initial drive operation"

The ECU 41 is provided with an exciting phase change counter 41b, which counts up or down every time when the exciting phase(s) of the motor 12 is changed. The exciting phase deviation correction value discussed above corresponds to a count value (hereinafter also referred to as an exciting phase change count value) of the exciting phase change counter 41b, which is counted from a time point of starting the sequentially changing of the exciting phase of the motor 12 until a time point when the rotor 32 begins to rotate synchronously with the sequential changing of the exciting phase of the motor 12 in the initial drive operation of the motor 12. Furthermore, the exciting phase deviation correction value may be obtained as a difference between the count value of the encoder counter 41a and the count value of the exciting phase change counter 41b at the end of the initial drive operation (i.e., the time point of changing the initial drive completion flag from OFF to ON in FIG. 8). This learning process (computing process) of learning the exciting phase deviation correction value through the initial drive operation is executed by the ECU 41 and functions as a phase deviation correction value learning functional unit or simply referred to as a phase deviation correction value learning unit 41f (often also referred to as a phase deviation correction value learning means) of the present disclosure. Here, it should be noted that although the phase deviation correction value learning unit 41f is implemented by the software in the ECU 41, the phase deviation correction value learning unit 41f may be alternatively implemented by a corresponding hardware (a circuit) in the ECU 41.

The ECU 41 can only sense the amount of rotation (the rotational angle) from a start-up position of the rotor 32 based on the encoder count value upon the start-up of the motor 12. Therefore, when an absolute position of the rotor 32 cannot be sensed with some measures immediately after the turning on of the electric power supply, the rotor 32 of the motor 12 cannot be correctly rotated to the target position.

Therefore, the ECU 41 executes a P-range wall abutment control operation. In the P-range wall abutment control operation, after the completion of the initial drive operation, the ECU 41 rotates the motor 12 until the rotation of the motor 12 (the rotation of the rotor 32) reaches a P-range side delimiting position of a movable range of the detent lever 15 (the rotatable member), which is limited by the detent mechanism 14 of the range change mechanism 11. More specifically, the ECU 41 rotates the motor 12 to rotate the detent lever 15 until the motor 12 (the rotor 32) is rotated to a rotational position, at which the engaging portion 23a of the detent spring 23 abuts against a P-range wall 24a of the P-range holding recess 24 of the detent lever 15 shown in FIG. 1B. In this way, the ECU 41 learns the P-range side delimiting position as a reference position of the rotor 32. Alternative to the P-range wall abutment control operation, a Non-P-range wall abutment control operation may be executed such that the ECU 41 rotates the motor 12 until the rotation of the motor 12 (the rotor 32) reaches a non-P-range side delimiting position of the movable range. More specifically, the ECU 41 rotates the motor 12 until the motor 12 is rotated to a rotational position, at which the engaging portion 23a of the detent spring 23 abuts against a non-P-range wall 25a of the non-P-range holding recess 25 of the detent lever 15 shown in FIG. 1B. In this way, the ECU 41 may learn the non-P-range side delimiting position as a reference position of the rotor 32. This reference position learning process functions as a reference position learning functional unit or simply referred to as a reference position learning unit 41g (often also referred to as a reference position learning means) of the present disclosure. Here, it should be noted that although reference position learning unit 41g is implemented by the software in the ECU 41, the reference position learning unit 41g may be alternatively implemented by a corresponding hardware (a circuit) in the ECU 41.

Figure 9:
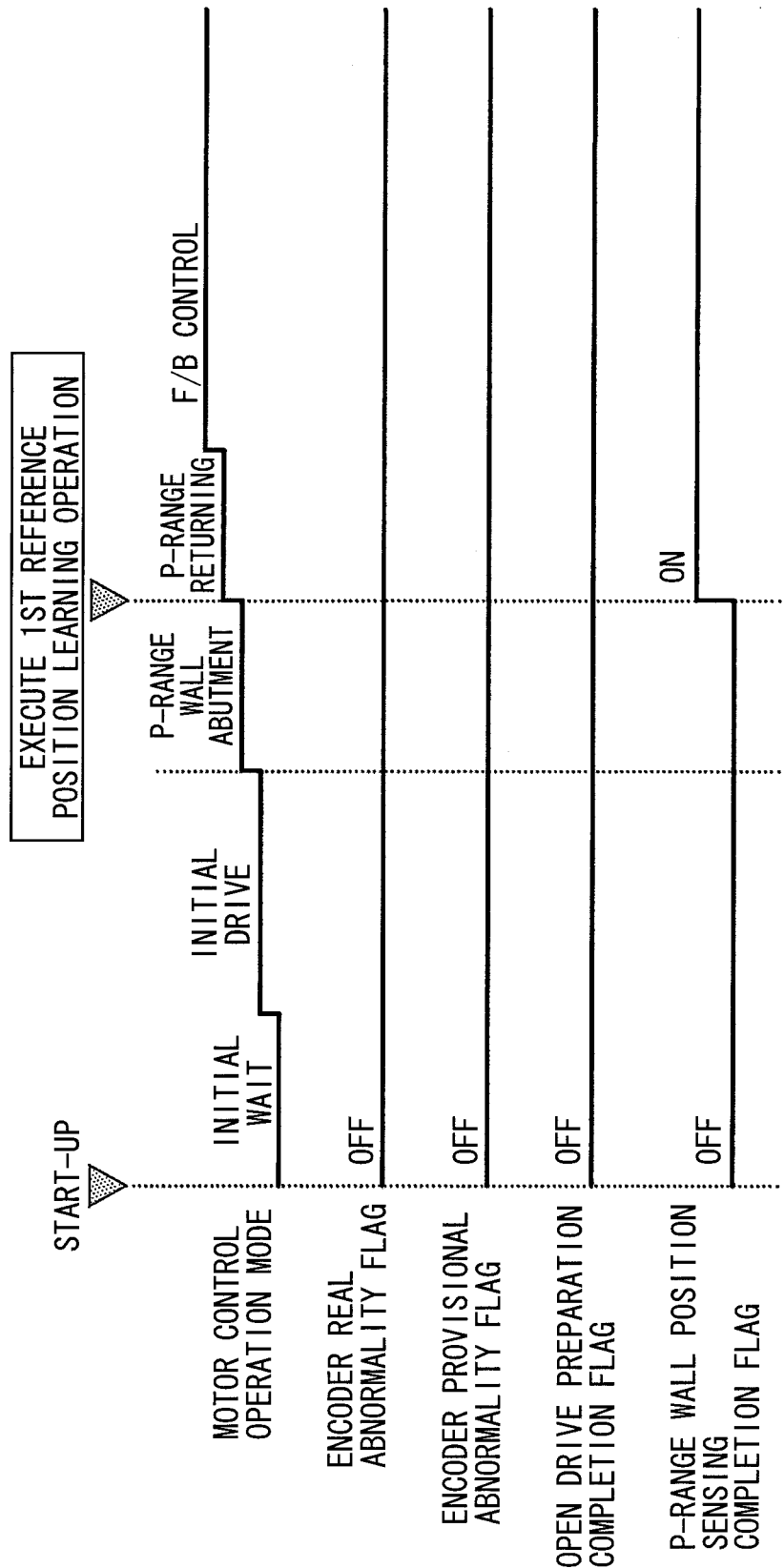
FIG. 9 is a time chart showing an exemplary control operation in a case where the encoder is in a normal operational state.

As shown in FIG. 9, in the case where the encoder 46 is normal, the exciting phase deviation correction value is learned by executing the initial drive operation upon the start-up of the motor 12 (more specifically, after elapse of an initial wait period upon turning on of the electric power supply as shown in FIG. 9). Then, the P-range wall abutment control operation (or the non-P-range wall abutment control operation) is executed to learn the P-range side delimiting position (or the Non-P-range side delimiting position) as the reference position. Thereafter, a P-range returning control operation (or a Non-P-range returning control operation is executed to return the shift range of the automatic transmission 27 to the P-range (or the Non-P-range). Next, a feedback control operation (hereinafter also referred to as F/B control operation), which is a normal motor control operation, is executed. The feedback control operation (process) functions as a feedback controlling functional unit or simply referred to as a feedback controlling unit 41c (often also referred to as a feedback control means) of the present disclosure. Here, it should be noted that although the feedback controlling unit 41c is implemented by the software in the ECU 41, the feedback controlling unit 41c may be alternatively implemented by a corresponding hardware (a circuit) in the ECU 41.

In this F/B control operation, when the target range (the target shift range of the automatic transmission) is set through the manipulation of the P-range switch 43 or the Non-P-range switch 44 by the driver of the vehicle, the ECU 41 sets an FIB target count value, which corresponds to the target range (the corresponding one of the P-range and the Non-P range), based on the learning value (also referred to as the learned value) of the reference position of the rotor 32. Then, the ECU 41 begins to drive the motor 12, so that the rotor 32 of the motor 12 is rotated by sequentially changing the exciting phase(s) of the motor 12 based on the encoder count value until the encoder count value reaches the FIB target count value. In the following description, the learning of the reference position through the P-range wall abutment control operation will be referred to as a first reference position learning operation (or simply referred to as the 1st learning).

At this time, the FIB target count value is set in a manner shown in FIG. 13. Specifically, in the case where the target range is the P-range, the F/B target count value for the P-range (hereinafter, referred to as a P-range F/B target count value) is set by adding an encoder count value kOFFSETP, which is a count value to be counted from the learned reference position (the encoder count value) to a bottom of the P-range holding recess 24 upon the rotation of the rotor 32, to the learned reference position (the encoder count value).

*P*-range *F/B* target count value=Reference position+
  *k*OFFSET*P*

In the case where the target range is the Non-P-range, a F/B target count value for the Non-P-range (hereinafter, referred to as a Non-P-range F/B target count value) is set by adding an encoder count value kOFFSETNP, which is a count value to be counted from the learned reference position (the encoder count value) to a bottom of the Non-P-range holding recess 25 upon the rotation of the rotor 32, to the learned reference position (the encoder count value).

Non-*P*-range *F/B* target count value=Reference position+*k*OFFSETN*P*

When the F/B control system of the motor 12 fails due to, for example, breaking of a circuit conductive line (or simply referred to as "line breaking") of the encoder 46, the FIB control operation of the motor 12 cannot be performed, thereby resulting in the failure (abnormality) of the F/B control operation of the motor 12. In the present embodiment, the ECU 41 periodically executes a failure monitoring program (a failure monitoring means) during the period of the turning on of the electric power supply to check whether the failure exists in the F/B control system (e.g., the failure in the encoder 46), i.e., whether the failure exists in the F/B control operation of the motor 12. The failure monitoring program functions as a failure monitoring functional unit or simply referred to as a failure monitoring unit 41*d* (often also referred to as a failure monitoring means) of the present disclosure. Although the failure monitoring unit 41*d* is implemented by the software in the ECU 41, the failure monitoring unit 41*d* may be alternatively implemented by a corresponding hardware (a circuit) in the ECU 41. When the failure of the F/B control system (i.e., the failure of the F/B control operation) is sensed, the ECU 41 changes the F/B control operation to an open-loop control operation. In the open-loop control operation, the feedback of the information of the encoder count value is not executed, and the ECU 41 rotates the rotor 32 to the target position by sequentially changing the exciting phase(s) of the motor 12.

Figure 11:
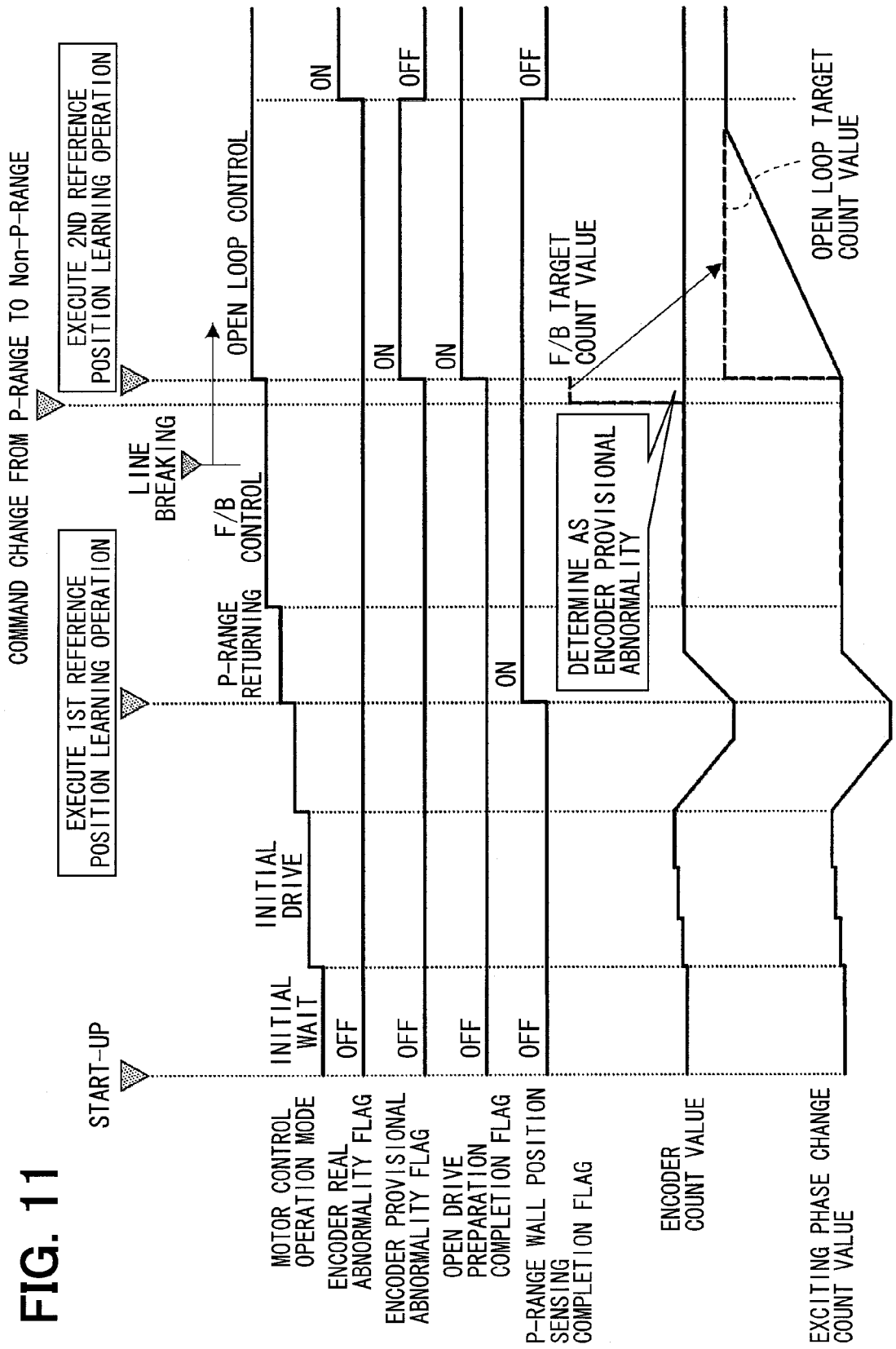
FIG. 11 is a time chart showing an exemplary control operation in a case where the encoder becomes in an abnormal operational state in the middle of driving the motor.

The failure diagnosis of the F/B control system may be executed by, for example, a diagnosis method recited in US2004/0008002A1 (corresponding to JP2004-56855A). In the present embodiment, as shown in FIG. 11, the ECU 41 determines occurrence of an encoder provisional abnormality (the failure of the F/B control system) when the ECU 41 senses a state, in which the encoder count value does not change even upon changing of the exciting phase(s) of the motor 12 during the F/B control operation. In such a case, the ECU 41 changes a state of an encoder provisional abnormality flag (EPA flag) from "OFF" to "ON".

According to the present embodiment, in order to rotate the rotor 32 to the target position through execution of the open-loop control operation at the time of the occurrence of the failure in the F/B control system, there is provided the exciting phase change counter 41*b*, which counts up or down every time when the exciting phase(s) of the motor 12 is changed. Specifically, since the time of start-up of the motor 12, the exciting phase change counter 41*b* counts up or down the count value (exciting phase change count value) by a predetermined value according to the rotational direction of the rotor 32 every time when the exciting phase(s) of the motor 12 is changed.

In the present embodiment, the amount of increase or decrease in the exciting phase change count value per count-up or count-down of the exciting phase change counter 41*b* (per change of the exciting phase(s) of the motor 12) is set to coincide with the amount of increase or decrease in the encoder count value per a predetermined rotational angle (a predetermined rotational angular range) of the rotor 32, which is rotated by the single change (one change) of the exciting phase(s) of the motor 12. For example, in the system where the amount of increase or decrease in the encoder count value, which is measured during the time period of rotating the rotor 32 through a predetermined rotational angle upon execution of the single change of the exciting phase(s) of the motor 12, is "N", the exciting phase change count value may be counted up or down by "N" every time when the exciting phase(s) of the motor 12 is changed. In this way, a difference between the exciting phase change count value and the encoder count value coincides with the exciting phase deviation correction value.

Exciting phase change count value−Encoder count value=Exciting phase deviation correction value Exciting phase change count value=Encoder count value+Exciting phase deviation correction value Similar to the encoder counter 41*a*, the exciting phase change counter 41*b* counts up or down in all of the motor control operation modes (the initial drive operation, the P-range wall abutment control operation, the P-range returning control operation, the F/B control operation and the open-loop control operation) such that the exciting phase change count value of the exciting phase change counter 41*b* is counted up or down by a predetermined value according to the rotational direction of the rotor 32 every time when the exciting phase(s) of the motor 12 is changed.

In a system where the amount of increase or decrease in the exciting phase change count value of the exciting phase change counter 41*b* per count-up or count-down thereof does not coincide with the amount of increase or decrease in the encoder count value per the corresponding rotational angular range of the rotor 32, which is rotated by the single change of the exciting phase(s) of the motor 12, correction may be made to coincide the exciting phase change count value and the encoder count value with each other.

When the ECU 41 changes the motor control operation mode from the F/B control operation to the open-loop control operation upon the sensing of the failure in the F/B control system, the ECU 41 sets an open-loop target count value by correcting the FIB target count value (corresponding to the target range) with the exciting phase deviation correction value. Then, the ECU 41 drives the rotor 32 until the exciting phase change count value reaches the open-loop target count value. This fail-safe process functions as a fail-safe functional unit or simply referred to as a fail-safe unit 41*e* (often also referred to as a fail-safe means) of the present disclosure. Here, it should be noted that although the fail-safe unit 41*e* is implemented by the software in the ECU 41, the fail-safe unit 41*e* may be alternatively implemented by a corresponding hardware (a circuit) in the ECU 41.

Figure 10:
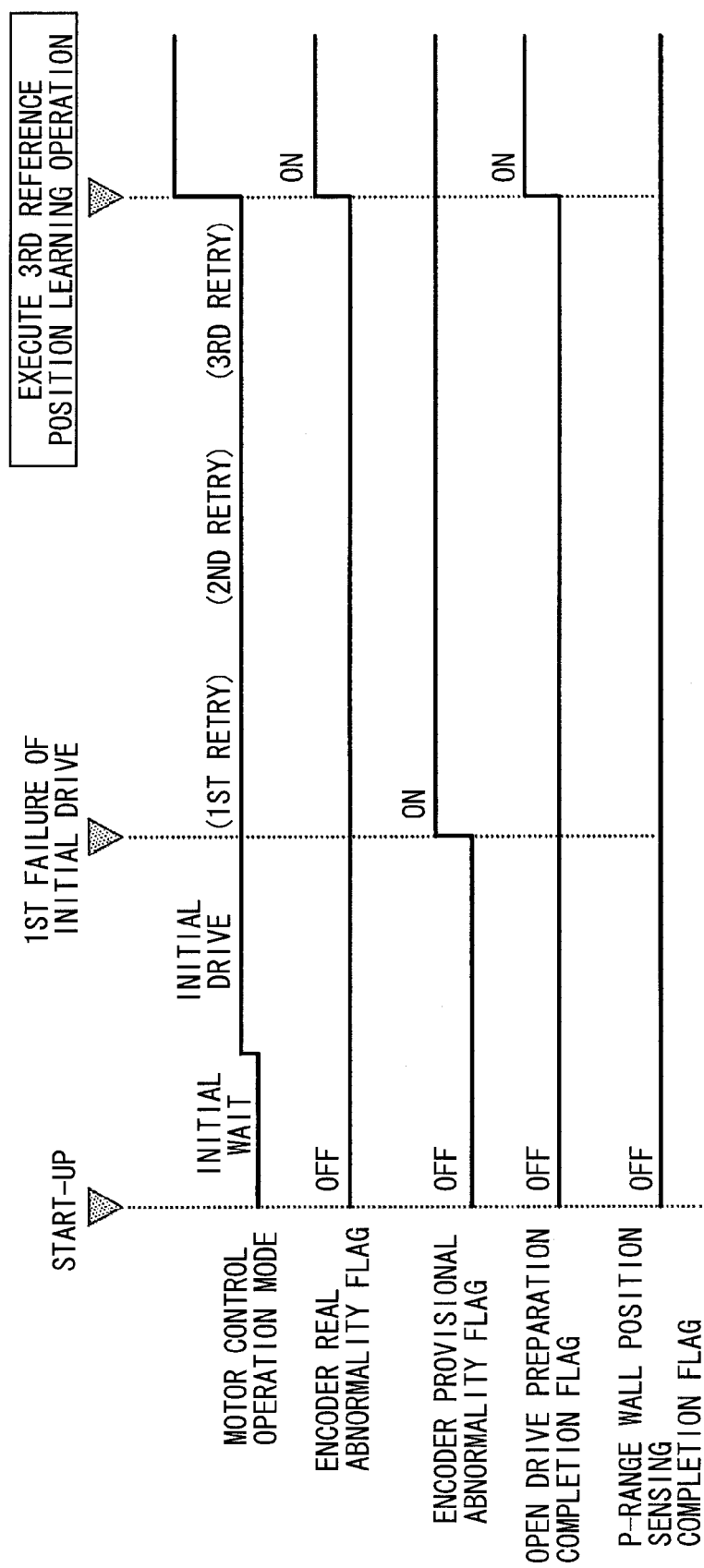
FIG. 10 is a time chart showing an exemplary control operation in a case where the encoder is in an abnormal operational state from the begging of start-up of the motor.

Open-loop target count value=*F/B* target count value+
  exciting phase deviation correction value As shown in FIG. 10, in the case where the encoder 46 is abnormal from the begging of the start-up of the motor 12, the learning of the exciting phase deviation correction value fails even when the initial drive operation of the motor 12 is executed upon the start-up of the motor 12. Thus, in the case where the learning of the exciting phase deviation correction value fails, the initial drive operation of the motor 12 is executed once again (retried). In a case where the learning of the exciting phase deviation correction value fails even upon the retrying of the initial drive operation of the motor 12 for a predetermined number of times (e.g., three times), a third reference position learning operation (or simply referred to as the 3rd learning) is executed, so that the motor control operation mode is changed to the open-loop control operation that is executed at the time of sensing the failure of the F/B control system. In such a case, the learning value (also referred to as the learned value) of the exciting phase deviation correction value is absent, and the learning value (also referred to as the learned value) of the reference position obtained through the P-range wall abutment control operation is also absent. Thus, the reference position for the open-loop control operation cannot be set by using the learning value (the learned value) of the reference position and the learning value (the learned value) of the exciting phase deviation correction value. Therefore, in the third reference position learning operation, the reference position for the open-loop control operation is set by adding a design value of the encoder count value, which should be counted from the bottom of the P-range holding recess 24 to the P-range side delimiting position (wall position) upon rotation of the rotor 32, to the current exciting phase change count value.

> Reference position for open-loop control operation (at the time of absence of the learning value)=exciting phase change count value+design value Furthermore, as shown in FIG. 11, in a case where the failure of the F/B control system (e.g., the breaking of the circuit conductive line of the encoder 46) occurs during the F/B control operation after the normal execution of the initial drive operation, the P-range wall abutment control operation and the P-range returning control operation upon the start-up of the motor 12, the learning of the exciting phase deviation correction value through the initial drive operation and the first reference position learning operation through the P-range wall abutment control operation have been normally executed. Therefore, in such a case, at the time of changing the motor control operation mode from the F/B control operation to the open-loop control operation upon the sensing of the failure of the F/B control system, the open-loop target count value is set by correcting the F/B target count value (corresponding to the target range) with the exciting phase deviation correction value. Specifically, the reference position for the open-loop control operation is obtained by correcting the learning value (also referred to as the learned value) of the reference position with (based on) the exciting phase deviation correction value. Then, the open-loop target count value is set based on the reference position for the open-loop control operation. Hereinafter, the learning of the reference position for the open-loop control operation will be referred to as a second reference position learning operation (or simply referred to as the 2nd learning). Thereby, the setting method, which sets the open loop target count value, of the case of FIG. 11 is different from that of FIG. 10 discussed above.

Figure 12:
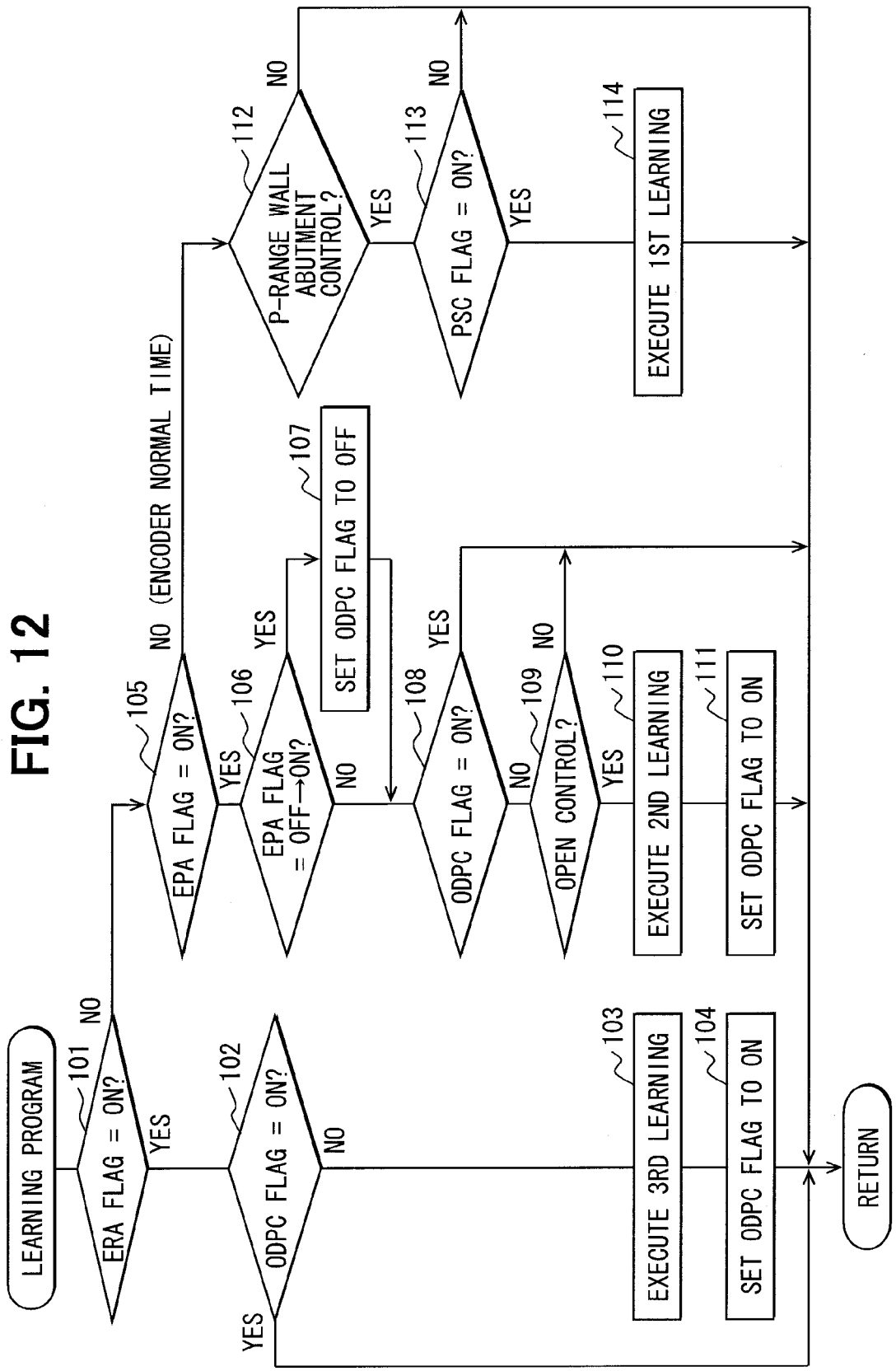
FIG. 12 is a flowchart showing a flow of a reference position learning program according to the embodiment.

> Reference position for open-loop control operation (in the presence of the learning value)=Reference position learning value+Exciting phase deviation correction value The learning of the reference position of the present embodiment discussed above is executed by the ECU 41 according to a reference position learning program shown in FIG. 12. The reference position learning program of FIG. 12 is repeated at predetermined intervals as long as the electric power source of the ECU 41 is turned on. When the reference position learning program starts, the operation proceeds to step 101 of FIG. 12. At step 101, it is determined whether a state of an encoder real abnormality flag (also referred to as a ERA flag) is ON. As shown in FIG. 11, when the state of the encoder provisional abnormality flag (also referred to as a EPA flag) is changed from ON to OFF, the state of the encoder real abnormality flag (ERA flag) is changed from OFF to ON. For example, when the breaking of the circuit conductive line of the encoder 46 (the failure of the F/B control system) is sensed, the state of the encoder provisional abnormality flag (EPA flag) is changed from OFF to ON. Then, the motor control operation mode is changed from the FIB control operation to the open-loop control operation. Thereafter, when the rotor 32 is rotated to the target position, the state of the encoder provisional abnormality flag (EPA flag) is changed from ON to OFF, and the state of the encoder real abnormality flag (ERA flag) is changed from OFF to ON.

When it is determined that the state of the encoder real abnormality flag (ERA flag) is OFF at step 101, the operation proceeds to step 105. At step 105, it is determined whether the state of the encoder provisional abnormality flag (EPA flag) is ON. When it is determined that the state of the encoder provisional abnormality flag (EPA flag) is OFF at step 105, it is determined that the encoder 46 is normal (there is no failure in the FIB control system). Thereby, the operation proceeds to step 112. At step 112, it is determined whether the current motor control operation mode is the P-range wall abutment control operation. When it is determined that the current motor control operation mode is not the P-range wall abutment control operation at step 112, the present program is terminated.

In contrast, when it is determined that the current motor control operation mode is the P-range wall abutment control operation at step 112, the operation proceeds to step 113. At step 113, it is determined whether a state of a P-range wall position sensing completion flag (also referred to as a PSC flag) is ON. When it is determined that the state of the P-range wall position sensing completion flag (PSC flag) is OFF at step 113, it is determined that it is still in the middle of the P-range wall abutment control operation. Thereby, the present program is terminated.

When it is determined that the state of the P-range wall position sensing completion flag (PSC flag) is ON at step 113, it is determined that the P-range wall abutment control operation is completed. Thus, the operation proceeds to step 114. At step 114, the first reference position learning operation (the 1st learning) is executed, so that the P-range wall position is learned as the reference position, and the present program is terminated.

Furthermore, when it is determined that the state of the encoder provisional abnormality flag (EPA flag) is ON at step 105, the operation proceeds to step 106. At step 106, it is determined whether it is the time immediately after the changing of the state of the encoder provisional abnormality flag (EPA flag) from OFF to ON. When it is determined that it is the time immediately after the changing of the state of the encoder provisional abnormality flag (EPA flag) from OFF to ON at step 106, the operation proceeds to step 107. At step 107, a state of an open drive preparation completion flag (also referred to as an ODPC flag) is reset to OFF. Then, the operation proceeds to step 108. When it is determined that it is not the time immediately after the changing of the state of the encoder provisional abnormality flag (EPA flag) from OFF to ON at step 106, the operation also proceeds to step 108.

At step 108, it is determined whether the state of the open drive preparation completion flag (ODPC flag) is ON. When it is determined that the state of the open drive preparation completion flag (ODPC flag) is ON at step 108, the present program is terminated.

In contrast, when it is determined that the state of the open drive preparation completion flag (ODPC flag) is OFF at step 108, the operation proceeds to step 109. At step 109, it is determined whether the current motor control operation mode is the open-loop control operation. When it is determined that the current motor control operation mode is not the open-loop control operation at step 109, the present program is terminated.

In contrast, when it is determined the current motor control operation mode is the open-loop control operation at step 109, the operation proceeds to step 110. At step 110, the second reference position learning operation (the 2nd learning) is executed, so that the reference position for the open loop control operation is set by correcting the learning value (also referred to as the learned value) of the reference position with (based on) the exciting phase deviation correction value. Thereafter, the operation proceeds to step 111. At step 111, the state of the open drive preparation completion flag (ODPC flag) is changed to ON, and the present program is terminated.

When it is determined the state of the encoder real abnormality flag (ERA flag) is ON at step 101, the operation proceeds to step 102. At step 102, it is determined whether the state of the open drive preparation completion flag (ODPC flag) is ON. When it is determined that the state of the open drive preparation completion flag (ODPC flag) is ON at step 102, it is determined that the setting of the reference position for the open loop control operation is completed. Then, the present program is terminated.

In contrast, when it is determined that the state of the open drive preparation completion flag (ODPC flag) is OFF at step 102, it is determined that the reference position for the open loop control operation has not been set. Thus, the operation proceeds to step 103. At step 103, the third reference position learning operation (the 3rd learning) is executed, so that the reference position for the open-loop control operation is set by adding the design value of the encoder count value, which should be counted from the bottom of the P-range holding recess 24 to the P-range side delimiting position (wall position) upon rotation of the rotor 32, to the current exciting phase change count value. Thereafter, the operation proceeds to step 104. At step 104, the state of the open drive preparation completion flag (ODPC flag) is changed to ON, and the present program is terminated.

In the present embodiment discussed above, during the period of rotating the motor 12, the encoder counter 41*a* counts up or down to renew the encoder count value every time when the pulse signal is outputted from the encoder 46 upon the rotation of the rotor 32. Also at this time, the exciting phase change counter 41*b* counts up or down to renew the exciting phase change count value every time when the exciting phase(s) of the motor 12 is changed. At this time, in the case of the system, in which the rotor 32 of the motor 12 is rotatable in both of the normal rotational direction and the reverse rotational direction, the encoder count value and the exciting phase change count value are counted up or down according to the rotational direction of the rotor 32. Thereby, during the F/B control operation, the encoder count value and the exciting phase change count value change while maintaining the predetermined relationship therebetween. However, the initial exciting phase of the motor 12 immediately after the turning on of the electric power supply and the actual rotational position of the rotor 32 often deviate from each other. Therefore, in the case where the initial exciting phase of the motor 12 immediately after the turning on of the electric power supply and the actual rotational position of the rotor 32 deviate from each other, the rotor 32 does not rotate until the exciting phase coincides with the actual rotational position of the rotor 32 even upon changing of the exciting phase. Therefore, even in the case where the exciting phase change counter 41*b* is counted up or down every time when the exciting phase of the motor 12 is changed, the encoder count value does not change until the rotor 32 is rotated synchronously with the exciting phase change upon coinciding of the exciting phase and the actual rotational position of the rotor 32 with each other. Thus, the deviation exists between the exciting phase change count value and the encoder count value, and this deviation corresponds to the exciting phase deviation correction value that corresponds to the number of changes of the exciting phase(s) of the motor 12 (the phase deviation of the exciting phase), which is required for the exciting phase to coincide with the actual rotational position of the rotor 32.

In view of the above relationship, according to the present embodiment, at the time of changing the motor control operation mode from the F/B control operation to the open loop control operation upon the sensing of the failure of the F/B control system (e.g., the failure of the encoder 46), the open-loop target count value is set by correcting the F/B target count value with the exciting phase deviation correction value for the encoder count value. In this way, even in the case where the output shaft sensor (the sensor that senses a rotational position of the rotatable member of the control subject), which senses the rotational angle of the output shaft 13 of the motor 12, is absent, the rotor 32 can be rotated to the target position by changing the motor control operation mode from the F/B control operation to the open loop control operation upon the occurrence of the failure of the F/B control system of the motor 12. Thereby, while the fail-safe is ensured at the time of occurrence of the failure of the F/B control system, the number of the required components can be reduced or minimized, and the costs can be reduced or minimized.

The encoder 46 of the present disclosure is not limited to the magnetic encoder. For instance, in place of the magnetic encoder, an optical encoder or a brush encoder may be used as the encoder of the present disclosure.

Furthermore, in the above embodiment, the switched reluctance motor (SR motor) is used as the motor 12. However, the motor 12 is not limited to the SR motor. That is, in place of the SR motor, it is possible to use any other type of brushless synchronous motor, in which an exciting phase(s) is sequentially changed by sensing a rotational position of a rotor based on a count value of an output signal(s) of the encoder.

Furthermore, in the range change apparatus of the above embodiment, the range is changed between the two ranges, i.e., the P-range and the Non-P-range. Alternatively, the present disclosure may be applied to a range change apparatus, in which a range change valve and a manual valve of the automatic transmission are changed synchronously with the rotational operation of the detent lever 15 to change the shift range of the automatic transmission to any one of the parking range (P-range), the reverse range (R-range), the neutral range (N-range) and the drive range (D-range) and the like.

Furthermore, the present disclosure is not limited to the range change apparatus. That is, the present disclosure may be applied to any other type of position change apparatus, which uses the brushless synchronous motor (e.g., the SR motor) as its drive source. Also, the present disclosure may be applied to a system that includes an output shaft sensor (a sensor that senses a rotational position of the rotatable member of the control subject), which senses a rotational angle of an output shaft of an electric motor.

In the above embodiment, the control subject is the range change mechanism 11, and the rotatable member of the control subject includes the output shaft 13 and the detent lever 15, which are rotated together by the motor 12.

Additional advantages and modifications will readily occur to those skilled in the art. The present disclosure in its broader terms is therefore not limited to the specific details, representative apparatus, and illustrative examples shown and described.

What is claimed is:

1. A motor control apparatus comprising:
    an encoder that outputs a pulse signal every time when a rotor of an electric motor, which rotates a control subject, is rotated by a predetermined rotational angle;
    an encoder counter that counts up or down the pulse signal of the encoder;
    an exciting phase change counter that counts up or down every time when an exciting phase of the electric motor is changed;
    a feedback controlling unit that executes a feedback control operation of the electric motor by sequentially changing the exciting phase of the electric motor based on a count value of the encoder counter to rotate the rotor until the count value of the encoder counter reaches a feedback target count value, which corresponds to a target rotational position of the rotor;
    a failure monitoring unit that monitors whether a failure exists in a feedback control system of the electric motor; and
    a fail-safe unit that changes the feedback control operation to an open loop control operation when the failure of the feedback control system is sensed with the failure monitoring unit, wherein when the fail-safe unit executes the open loop control operation, the fail-safe unit sequentially changes the exciting phase of the electric motor without executing feedback of information of the count value of the encoder counter in the open loop control operation and rotates the rotor until a count value of the exciting phase change counter reaches an open loop target count value, which corresponds to the target rotational position of the rotor, wherein:
    when the fail-safe unit changes the feedback control operation to the open loop control operation upon the sensing of the failure of the feedback control system, the fail-safe unit sets the open loop target count value by correcting the feedback target count value based on an exciting phase deviation correction value for the count value of the encoder counter.

2. The motor control apparatus according to claim 1, further comprising a phase deviation correction value learning unit that executes an initial drive operation of the electric motor, which sequentially changes the exciting phase of the electric motor, in the open loop control operation upon turning on of electric power supply to the motor control apparatus, so that the phase deviation correction value learning unit learns the exciting phase deviation correction value based on the count value of the exciting phase change counter, which is counted from a time point of starting the sequentially changing of the exciting phase of the electric motor until a time point when the rotor begins to rotate synchronously with the sequential changing of the exciting phase of the electric motor.

3. The motor control apparatus according to claim 1, further comprising a reference position learning unit that executes a learning operation to learn a reference position of the rotor by rotating the electric motor until the control subject is rotated to a delimiting position of a movable range of the control subject, wherein:
    the feedback controlling unit sets the feedback target count value based on the reference position of the rotor, which is learned with the reference position learning unit;
    the fail-safe unit sets the reference position of the rotor, which is used at the time of executing the open loop control operation, by correcting the reference position of the rotor, which is learned with the reference position learning unit, based on the exciting phased deviation correction value; and
    the fail-safe unit sets the open loop target count value based on the reference position of the rotor, which is used at the time of executing the open loop control operation.

4. The motor control apparatus according to claim 3, wherein:
    when the reference position learning unit is not executing the learning operation to learn the reference position of the rotor, the fail-safe unit sets the reference position of the rotor, which is used at the time of executing the open loop control operation, by correcting the count value of the exciting phase change counter with a design value; and
    the fail-safe unit sets the open loop target count value based on the reference position of the rotor, which is used at the time of executing the open loop control operation.

5. The motor control apparatus according to claim 1, wherein an amount of increase or decrease in the count value of the exciting phase change counter per count-up or count-down of the exciting phase change counter is set to coincide with an amount of increase or decrease in the count value of the encoder counter per a predetermined rotational angle of the rotor, which is rotated by one change of the exciting phase of the electric motor.

6. The motor control apparatus according to claim 1, wherein the control subject is a range change mechanism, which changes a shift range.

* * * * *